(12) United States Patent
Jeran

(10) Patent No.: US 7,064,872 B1
(45) Date of Patent: Jun. 20, 2006

(54) EXPOSURE CONTROL FOR A CCD SCANNER

(75) Inventor: Paul L Jeran, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/414,383

(22) Filed: Oct. 7, 1999

(51) Int. Cl.
H04N 1/04 (2006.01)
H01L 27/00 (2006.01)

(52) U.S. Cl. .................. 358/475; 358/474; 358/296; 358/297; 358/486; 250/208.1

(58) Field of Classification Search ............... 358/475, 358/406, 497, 462, 474, 296, 297, 486; 250/208.1
See application file for complete search history.

(56) References Cited

U.S. PATENT DOCUMENTS

| | | | |
|---|---|---|---|
| 3,650,193 A | 3/1972 | Shimizu | 95/53 EB |
| 3,900,855 A | 8/1975 | Stempeck | 354/29 |
| 3,950,766 A | 4/1976 | Erlichman et al. | 354/29 |
| 3,998,547 A * | 12/1976 | Schroter et al. | 355/68 |
| 4,716,300 A * | 12/1987 | Andrich et al. | 358/494 |
| 4,879,576 A | 11/1989 | Naito | 355/214 |
| 4,990,953 A * | 2/1991 | Ibuchi | 355/69 |
| 5,111,218 A | 5/1992 | Lebeau et al. | 346/107 R |
| 5,151,797 A * | 9/1992 | Nosaki et al. | 358/448 |
| 5,276,530 A * | 1/1994 | Siegel | 355/55 |
| 5,336,878 A * | 8/1994 | Boyd et al. | 250/208.1 |
| 5,484,994 A | 1/1996 | Roustaei | 235/462 |
| 5,596,360 A * | 1/1997 | Ichinose | 347/256 |
| 5,608,547 A * | 3/1997 | Nakatani et al. | 358/505 |
| 5,625,470 A | 4/1997 | Ueta et al. | 358/505 |
| 5,744,795 A * | 4/1998 | Bianchi et al. | 250/234 |
| 5,870,203 A * | 2/1999 | Chiu et al. | 356/430 |
| 6,002,124 A * | 12/1999 | Bohn et al. | 235/462.13 |
| 6,252,645 B1 * | 6/2001 | Nagano et al. | 355/18 |
| 6,294,776 B1 * | 9/2001 | Miksch et al. | 235/462.45 |

OTHER PUBLICATIONS

Toshifumi, Yamamoto (Toshiba Corp.). Apr. 2, 1996. Patent Abstracts of Japan: JP08088734.
Takei Toru et al (Hitachi Ltd.). Oct. 21, 1992. Patent Abstracts of Japan: JP04297177.
Inuzuka Tatsumoto (Hitachi Ltd.). Mar. 17, 1992. Patent Abstracts of Japan: JP04084559.

(Continued)

Primary Examiner—Edward Coles
Assistant Examiner—Houshang Safaipour
(74) Attorney, Agent, or Firm—Matthew L. Wade (57) ABSTRACT

A scanner is disclosed that operates to maintain the image sensor in the scanner at a proper exposure level during the scanning of a page despite variations in the scan rate. The scanner includes an illumination system operable to produce light in response to receiving power and to project the light, as a scanning light, onto the page being scanned. In addition, the scanner includes apparatus for moving the scanning light relative to the page at a scan rate, an image sensor for measuring the light reflected from the page and an exposure control device for controlling the exposure of the image sensor. The exposure control device operates to control the exposure of the image sensor by regulating the power in relationship to the scan rate.

20 Claims, 4 Drawing Sheets

OTHER PUBLICATIONS

Seiichi, Ito (Fujitsu Ltd.). Jan. 26, 1990, Patent Abstracts of Japan: JP02025159.
Yasumasa, Nashida (Canon Inc.). Mar. 31, 1998. Patent Abstracts of Japan: JP10084458.
Takanari, Aoyama (Ricoh Co. ltd.). Sep. 10, 1993. Patent Abstracts of Japan: JP05236205.
Yoshiaki, Nakajima (Canon Inc.). Feb. 25, 1992. Patent Abstracts of Japan: JP04058664.
Mitsunobu, Ooue (Fujitsu Ltd.). Nov. 7, 1989. JP01276874.
Hidenori, Yamamoto. Feb. 25, 1986. Patent Abstracts of Japan: JP61039772.

* cited by examiner

EXPOSURE CONTROL FOR A CCD SCANNER

BACKGROUND OF THE INVENTION

Traditionally, in the office equipment context, to make a copy of an original document, a light lens xerographic copier was used. In these machines, the image of the original is focused on an area of a photo receptor, which is subsequently developed with a toner. The developed image on the photo receptor is then transferred to a copy sheet to create a permanent copy of the original.

In recent years, there has been made available what is known as digital scanners. A digital scanner performs some of the same functions as a light lens copier such as illumination of the original document as well as focusing the image through lenses and mirrors (via an optical system). In a digital scanner, however, the original image is focused onto one or more photo sensitive sensor elements of an image sensor. The image sensor may be, for example, a charged coupled device (CCD) or a complementary metal oxide semiconductor (CMOS) device. The sensor elements convert the original image into a set of analog voltage signals that can then be further processed into digital signals. These digital signals can be temporarily retained in a memory and then eventually used to operate a printing apparatus when it is desired to print copies of the original. In some scanners, the digital signals may be used to create facsimiles or electronic mail (e-mail) for transmission to external computing devices or stored in a data base for later use.

One common type of digital scanner is the flat bed scanner. Flat bed scanners typically include a horizontal glass platen, an illumination system, an optics system and an image sensor. In one example of a flat bed scanner, the illumination system, optics system and image sensor are all located on a motor driven carriage below the platen. In order to scan a page, the page is placed, image side down, on the platen. During the scanning process, the illumination system projects a scanning light onto the page while the carriage is moved beneath the platen. Due to the movement of the carriage, the projected scanning light illuminates progressively each section of the page at a certain rate. For purposes of this application, the rate at which each section of a page is progressively illuminated by the scanning light is referred to herein as the "scan rate".

As the projected scanning light illuminates each page section, the light reflected from the page section is focused (by the optics system) onto the image sensor. The image sensor in response captures the page section. This is accomplished as each individual sensor element of the image sensor reads the amount of light reflected from one point in the page section and transfers the information in the form of an analog voltage signal. The level of the voltage signal is proportionate to the number of photons of light that have struck the sensor element during the element's exposure.

In many flat bed scanners the actual scan rate can vary while a page is being scanned. This may be caused by changes in the ability of the scanner to process the data generated during the scanning operation or by human intervention. For example, during a scanning operation the scanner data buffer may reach capacity or the data transmission rate may be reduced. In either case, this can result in the scanner having to reduce the rate at which a page is being scanned.

Unfortunately, variability in scan rate can result in over exposure or under exposure of the image sensor during a scanning operation. If the image sensor is over or under exposed to a particular page section, the analog signals generated by the image sensor will not likely accurately represent the page section.

For example, if the scan rate drops below the standard scan rate while the image sensor is capturing a particular page section, this can result in the image sensor being over exposed to that page section. As a result, the sensor elements of the image sensor receive a greater number of photons while being exposed to this page section than what would be expected under proper exposure level conditions. This results in the image sensor generating a set of analog signals having voltage levels above the values that would accurately represent the page section.

On the other hand, if while capturing a page section, the scan rate goes above the standard scan rate this can result in the image sensor being "under exposed". As a result, the sensor elements of the image sensor receive a lesser number of photons while being exposed to this page section than what would be expected under proper exposure level conditions. This results in the image sensor generating a set of analog signals having voltage levels values below the values that would accurately represent the page section.

Prior art flat bed scanners handle the affect of scan rate variability on the exposure level of the image sensor using a number of techniques. For example, some scanners will perform image processing routines to the signals (typically after the analog signals have been digitized) which were generated for page sections where the image sensor was over or under exposed. Unfortunately, these image processing routines can require valuable computational resources to execute and can increase the amount of processing time required by the scanner to process the data generated after a page has been scanned.

Other scanners will re-scan the page section where the image sensor was over exposed or under exposed. This second technique can require additional mechanisms which can add complexity and expense to the scanner. In addition, re-scanning a page section can significantly increase the amount the time required for the scanner to complete a scanning operation.

Accordingly, there has been a need for an improved way to handle the affect of scan rate variability on the exposure level of an image sensor in a digital scanner.

SUMMARY OF THE INVENTION

In a preferred embodiment, the invention provides a scanner which operates to maintain the image sensor in the scanner at a proper exposure level during the scanning of a page despite variations in the scan rate.

An embodiment of the scanner according to the invention includes an illumination system operable to produce light in response to receiving power and to project the light, as a scanning light, onto the page being scanned. In addition, the scanner includes apparatus for moving the scanning light relative to the page at a scan rate, an image sensor for measuring the light reflected from the page and an exposure control device for controlling the exposure of the image sensor. The exposure control device operates to control the exposure of the image sensor by regulating the power in relationship to the scan rate.

In one implementation, the illumination system includes at least one light emitting diode for producing the light in response to receiving a pulse width modulated voltage from the power source. The exposure control device includes a control system for regulating the duty cycle of the pulse width modulated voltage in relationship to the scan rate.

In another implementation, the illumination system includes at least one light emitting diode for producing the light in response to receiving a current from the power source. The exposure control device includes a control system for regulating the amount of current received by the light emitting diode in relationship to the scan rate.

The present invention may also be implemented as a method of operating the illumination system in a digital scanner. The method preferably includes providing a light source operable to produce light in response to receiving power, applying power to the light source, and regulating the power in relationship to the scan rate. The light source may be a light emitting diode.

Other aspects and advantages of the present invention will become apparent from the following detailed description, taken in conjunction with the accompanying drawings, illustrating by way of example the principles of the present invention.

DETAILED DESCRIPTION OF THE INVENTION

For a general understanding of the present invention, reference is made to the drawings. In the drawings and in the specification, like reference numerals have been used throughout to designate identical or equivalent elements or steps.

Figure 1:
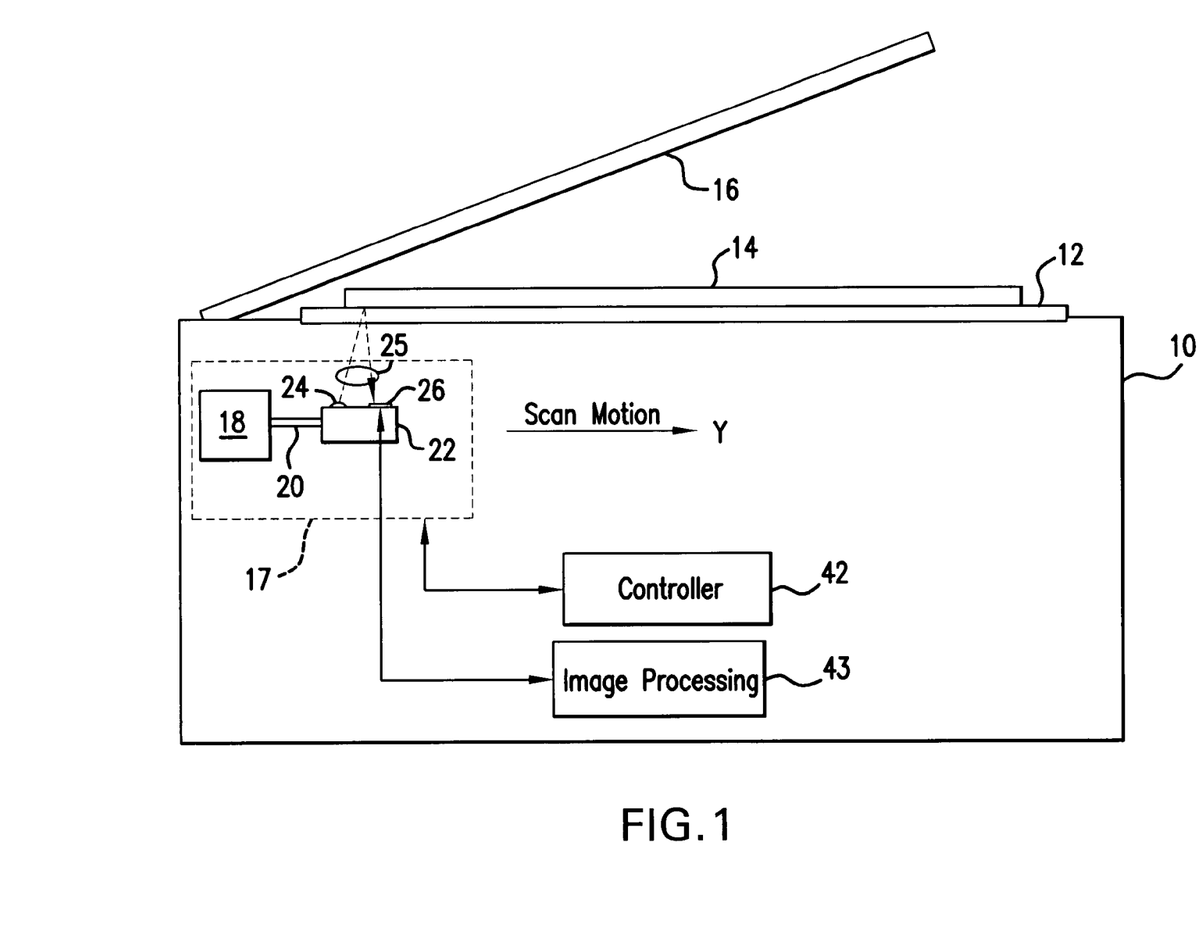
FIG. 1 is a simplified block diagram of a page scanner that incorporates certain aspects of the present invention.

FIG. 1 is a simplified block diagram of a page scanner 10 which incorporates certain aspects of the present invention. As indicated in FIG. 1, the page scanner 10 in this embodiment is a flat bed scanner.

The scanner 10 includes a transparent platen 12, a platen cover 16, and a scanning mechanism 17. The scanning mechanism 17 is mounted below the transparent platen 12 and includes a moveable carriage 22 and a stepper motor 18. The stepper motor 18 is mechanically coupled to the carriage 22 by a couple 20 and is driven by a controllable motor drive circuit 61 (illustrated in FIG. 3). The couple 20 may include gears, cables, or the like, and is adapted to enable the motor 18 to drive the carriage 22 in the Y direction along the length of the platen 12. Mounted to the carriage 20, for movement therewith, is an illumination system 24, an optics system 25 and an image sensor 26.

The image sensor 26, in this embodiment, is a charge coupled device (CCD) type image sensor including a trilinear array of photosensitive sensor elements configured to capture color information during a scanning operation. During a scanning operation, the reflected scan light is filtered by the optics systems 25 so that each array of sensor elements receives light in a particular frequency band. As a result, during a scanning operation, one of the three arrays receives light in a red frequency band, a second array receives light in a green frequency band and a third array receives light in a blue frequency band. It is noted, in other embodiments of the invention a different type of image sensor if used, such as a CMOS type image sensor. Also, the image sensor may be adapted to capture only the gray scale information of the page being scanned. In that case, the image sensor may include only a single array of photosensitive sensor elements.

As indicated in FIG. 1, various components of the scanning mechanism 17 are connected to and under the control of a controller 42. In addition, the image sensor 26 is connected as shown to an image processing unit 43. Also, as will be clear to a person skilled in the art, the controller 42 and the image processing unit 43 may be implemented in a number of ways. For example, the controller 42 and image processing unit 43 may include one or more microprocessors running under the direction of one or more software routines. Alternatively, or in combination, the controller 42 and the image processing unit 43 may include one or more state machine devices consisting of combinatorial logic circuits.

Figure 2:
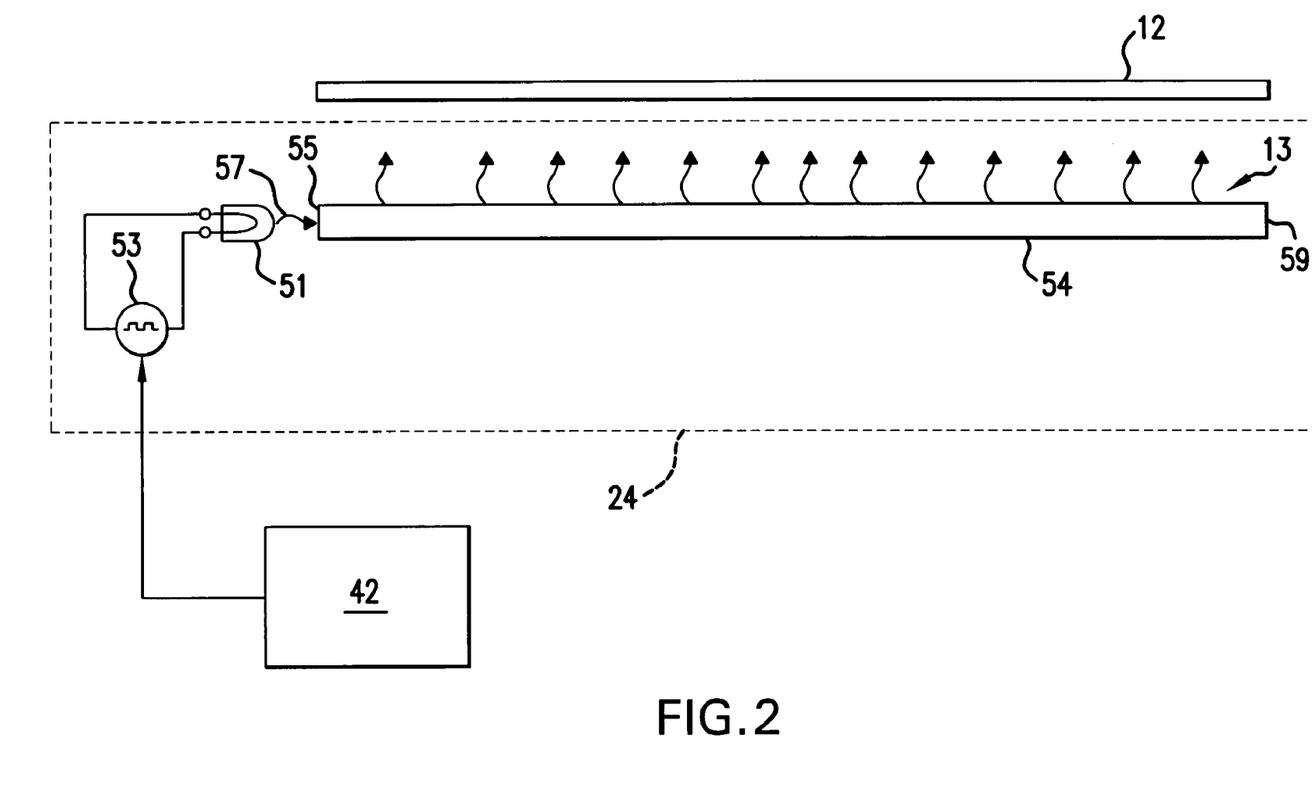
FIG. 2 illustrates certain components of an illumination system for the page scanner.

FIG. 2 illustrates certain components of the illumination system 24. As shown in FIG. 2, the illumination system 24 includes a light source which is, in this embodiment, a single light emitting diode (LED) 51. The illumination system 24 further includes a light pipe 54 and an LED drive circuit 53. The LED 51 and the light pipe 54 are configured such that the light 57 produced by the LED 51 is received by the light pipe 54 through an end 55. The internal reflectance of the light pipe 54 is such that this light is projected as a scanning light 13 through the platen directly above the carriage 22. The scanning light 13 is a strip of light adapted to illuminate a typical page 14 placed on the platen 12 one section at a time during a scanning operation. The LED 51, in this embodiment, is adapted to produce white light so that the light reflected from the page 14 includes color information.

It is noted that in other embodiments the function of the light pipe 54 is achieved by other optical elements. For example, an arrangement of lenses and mirrors could be used to project the light emitted by the LED onto the page 14. This type of arrangement, however, is typically not as efficient in conveying light as a light pipe. As a result, the light source may need to include more than one LED.

Importantly, as indicated in FIG. 2, power is applied to the LED 51 by an LED drive circuit 53. As will be explained in greater detail below, the LED drive circuit 53 applies a pulse width modulated voltage of the LED 51. As indicated in FIG. 2, the duty cycle of the modulated voltage and therefore the duty cycle of the LED 51, is under the control of the controller 42.

Figure 3:
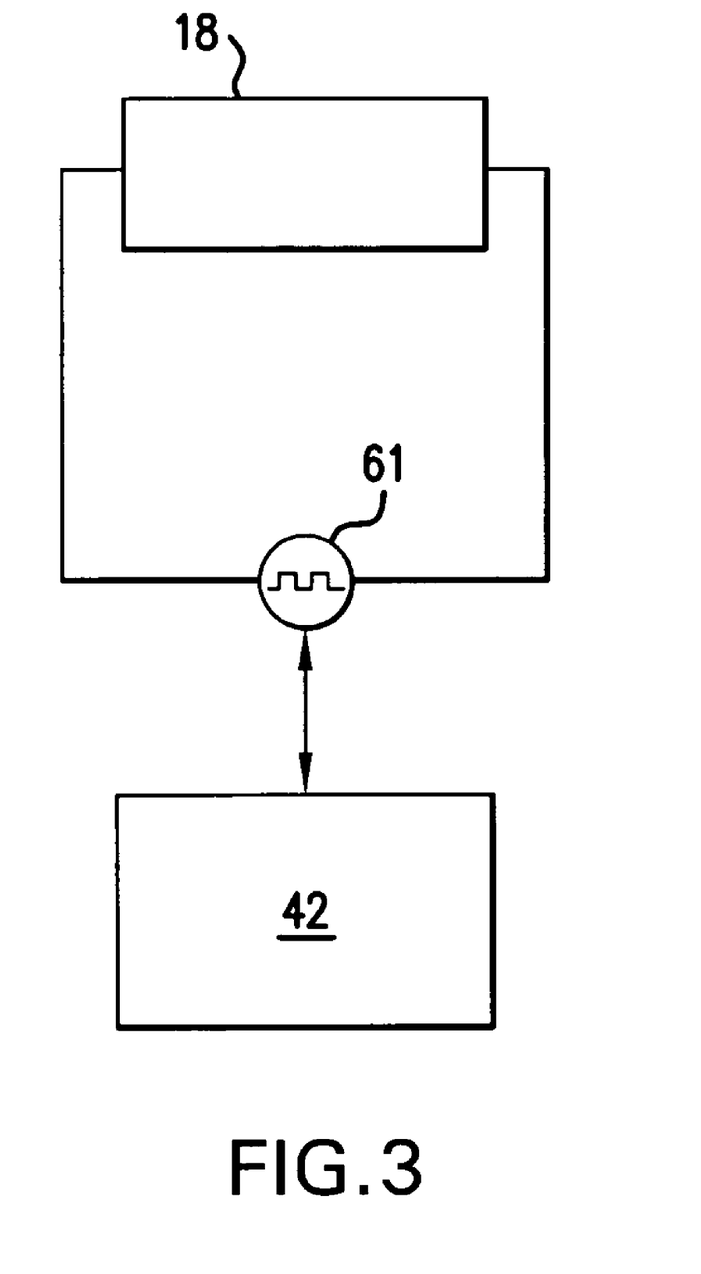
FIG. 3 is a simplified schematic diagram of the scanner controller and motor drive system.

FIG. 3 is a simplified schematic diagram of the controller 42 and the motor 18. As shown in FIG. 3, the motor 18 is driven by a motor drive circuit 61 which is also under the control of the controller 42. This enables the controller 42 to control the step rate of the motor 18 and therefore the scan rate during a scanning operation.

It is noted that because FIGS. 1–3 are schematics, the various electronic devices are shown as individual elements. For example, the LED drive circuit 51, the motor drive circuit 61 and the controller 42 are shown as individual elements. In actual implementations of the invention, however, they may be inseparable components of a single electronic device such as an application specific integrated circuit (ASIC).

Referring now to FIGS. 1–3, in order to make use of the scanner 10 to scan the page 14, the page 14 is first placed, image side down, on the platen 12. After the page is placed on the platen 12 a scanning operation is initiated in some manner. For example, the scanning operation, may be initiated by a user providing input to a user interface (not shown) coupled to the scanner 10.

During the scanning operation, the LED drive circuit 53, under the control of the controller 42, applies a pulse width modulated voltage to the LED 51. This causes the illumination system 24 to project the scanning light 13 onto the page 14. In addition, the motor drive circuit 61, under the control of controller 42, steps the motor 18. This in turn causes the motor 18 to move the carriage 22 in the Y direction beneath the platen 12. Due to the movement of the carriage 22, the scanning light 13 illuminates progressively each section of the page 14 at a scan rate.

As the scanning light 13 illuminates each section of the page 14, the light reflected from the page is focused, by the optics system 25, onto the sensor elements of the image sensor 26. The image sensor 26, in response, captures the image of the page section. As indicated above, the image sensor 26 records color information. For any one point in the page section, this is accomplished as three sensor elements (one from each sensor array of the image sensor 28) reads the amount of light reflected from the point after being filtered by the optics system 25. A first sensor element (from the first sensor array) reads the amount of reflected light in the red frequency band. A second sensor element (from the second sensor array) reads the amount of reflected light in the green frequency band. A third sensor element (from the third sensor array) reads the amount of reflected light in blue frequency band. This information is transferred in the form of analog voltage signals to the image processing unit 43. The image processing unit 43, in response, processes the analog voltage signals into digital signals.

After the scanning process is completed, the resulting set of digital signals may be used for a number of purposes. For example, the image processing unit 43 may then use these digital signals to communicate the image of page 14 to another computing device over an I/O port. Alternatively, or in combination, the digital signals may be used to cause a local printing mechanism (not shown) to print one or more copies of the page 14. In yet another alternative, the digital signals may be stored in a local data base.

Importantly, during the scanning operation just described, the scan rate can vary. As previously mentioned, in prior art scanners this condition can result in the image sensor being over exposed or under exposed to sections of the page while scanning.

According to the principles of the present invention, the controller 42 operates to maintain the exposure level of the image sensor 26 to an appropriate level (even if the scan rate is varied) by regulating the power applied to the LED 51 in relationship to the scan rate. If, for example, the scan rate is reduced while scanning a particular page section of the page 14, the amount of power applied to the LED 51 is also reduced proportionately. This serves to reduce the amount of light being emitted by the LED 51 to a level that results in proper exposure of the image sensor 26. As a result, the image sensor 26 generates analog signals that accurately represent the page section.

In this embodiment, the power to the LED 51 is regulated by the controller 42 adjusting the duty cycle of the pulse width modulated voltage applied by the LED drive circuit 53. This is done in accordance with the pre-determined relationship illustrated in FIG. 4.

Figure 4:
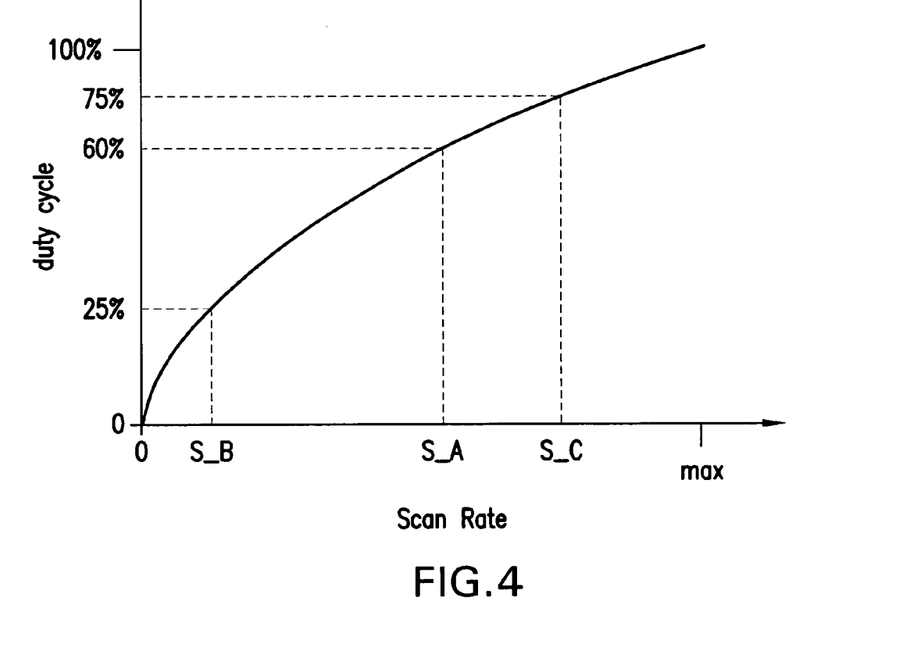
FIG. 4 is a diagram showing the relationship between scan rate and duty cycle that results in proper exposure of the scanner image sensor.

FIG. 4 is a diagram showing the relationship between scan rate and duty cycle that results in proper exposure of the image sensor 26. For example, if the scan rate is at "S_A" while scanning a particular page section, the image sensor 26 is properly exposed if the duty cycle of the pulse width voltage applied to the LED 51 is at 60%.

Thus, during the scanning operation of the page 14, the controller 42 operates to regulate the duty cycle of the LED 51 in relationship to the scan rate as illustrated in FIG. 4. This ensures the image sensor 26 remains at a proper exposure level throughout the scanning operation. For example, if the scan rate during scanning is at "S_A", the controller 42 maintains the duty cycle of the voltage applied to the LED 51 at 60%. If the controller 42 decreases the scan rate to S_B, for example, the controller 42 also reduces the duty cycle to 25% so as to maintain a proper exposure level for the image sensor 26. If the controller 42 increases the scan rate to S_C, the controller 42 also increases the duty cycle to 75% in order to maintain a proper exposure level of the image sensor 26.

It is noted that a number of techniques may be used to determine the relationship illustrated in FIG. 4. In this embodiment, for example, during the design phase of the scanner 10 a suitable test page is created. The test page image includes known density levels of red, green and blue. This test page is then used to define the curve illustrated in FIG. 4. For example, the test page is scanned at a scan rate of "S_A" with the duty cycle of the voltage applied to the LED 51 maintained at a first value. The analog signals generated by the image sensor 26 during this operation are then analyzed to determine if the image sensor 26 was over or under exposed. If over exposed, the duty cycle is reduced and the test is repeated. This continues until a duty cycle is determined that results in proper exposure of the image sensor 26. In this case the duty cycle determined by this method is 60%. Other points on the curve may be determined in a similar manner.

In the embodiment just described, the light source is a single white LED. In other embodiments two or more LED's are used as the light source. For example, in a second embodiment, the illumination system includes two white LED's and a light pipe similar to the one illustrated in FIG. 2. One of the LED's is arranged so that the light produced by the LED is received by the light pipe through one end. The other LED is arranged so that the light produced is received by the light pipe through the opposite end. During a scanning operation, a drive circuit and controller regulates power applied to each LED relationship to the scan rate in a similar manner described above.

The present invention may also be implemented by using LEDs that emit light in other frequency bands. In another embodiment, for example, a color scanner is provided wherein the illumination system includes a light source that includes a set of red, green and blue LEDs. During a scanning operation of a page, power is applied to each LED and regulated in a similar manner as described above so that the image sensor is properly exposed.

In the embodiments just described the power applied to the light source is regulated in relationship to the scan rate by regulating the duty cycle of the voltage applied to the LED(s). In other embodiments, the voltage is regulated by other means. For example, the LED drive circuit illustrated in FIG. 2 could be a current source under the control of the controller 42. During a scanning operation, the controller 42 operates to regulate the power applied to the LED by regulating the amount of current received by the LED in relationship to the scan rate.

It is also noted that in the first embodiment the scanning mechanism included an image sensor mounted to a moveable carriage. In other embodiments, the image sensor remains in a fixed location during a scanning operation. For example, the scanner 10 described above may include an automatic document feeder (ADF) positioned above the platen 12. During a scanning operation of a page using the ADF, the illumination system projects the scanning light through a pre-determined area on the platen 12. The ADF, at the same time, moves the page above this pre-determined area so as to illuminate progressively each section of the page at a certain scan rate. As each page section is illuminated, the reflected light is focused onto the image sensor which in response captures the page section. In contrast to the first embodiment, therefore, the scan rate is determined by operation of the ADF. Exposure control, however is provided using the same technique described above. Thus, the power applied to the light source is regulated in relationship to the scan rate in the same or similar manner as described above.

From the foregoing it will be appreciated that a scanner provided by the present invention represents a significant advance in the art. The scanner ensures the image sensor is properly exposed throughout a scanning operation even if the scan rate is varied. As a result, the need to perform prior art techniques (such as re-scanning page sections) for handling the over or under exposure of the image sensor are largely eliminated.

It should be understood that the foregoing description is only illustrative of the invention. Various alternatives and modifications can be devised by those skilled in the art without departing from the present invention. Accordingly, the present invention is intended to embrace all such alternatives, modifications and variances which fall within the scope of the appended claims.

What is claimed is:

1. A page scanner, comprising:
   an illumination system for producing light in response to receiving power from a power source and for projecting said light onto said page;
   means for moving said projected light relative to said page at a variable scan rate;
   an image sensor for measuring light reflected from said page; and
   means for controlling exposure of said image sensor to said reflected light by regulating said power in relationship to said variable scan rate;
   wherein the exposure controlling means operates to increase, while the page is being scanned, said power when the scan rate is increased; and
   wherein the exposure controlling means operates to decrease, while the page is being scanned, said power when the scan rate is decreased.

2. A page scanner according to claim 1, wherein said illumination system includes at least one light emitting diode (LED) for producing said light.

3. A page scanner according to claim 1, wherein said illumination system includes at least one light emitting diode (LED) for receiving a voltage from said power source and for producing said light in response thereto and said exposure control means includes means for regulating said power by pulse width modulating said voltage.

4. A page scanner according to claim 1, wherein said illumination system includes at least one light emitting diode (LED) for receiving a pulse width modulated voltage from said power source and for producing said light in response thereto and said exposure control means includes means for regulating the duty cycle of said pulse width modulated voltage in relationship to said scan rate.

5. A page scanner according to claim 1, wherein said illumination system includes at least one light emitting diode (LED) for receiving a current from said power source and for producing said light in response thereto and said exposure control means includes means for regulating said power by regulating said current in relationship to said scan rate.

6. An illumination system for a digital scanner, said digital scanner capable of scanning a page by using said illumination system to project a scanning light onto said page and to move said scanning light relative to said page at a scan rate while exposing an image sensor to light reflected from said page, said illumination system comprising:
   a light source operable to produce said light in response to receiving power;
   a drive circuit operable to apply power to said light source; and
   means for regulating said power in relationship to said scan rate so as to control the exposure of said image sensor while a page is being scanned; and
   wherein the regulating means operates to increase said power when the scan rate is increased and to decrease the power when the scan rate is decreased.

7. An illumination system according to claim 6, wherein said light source includes at least one light emitting diode (LED) for producing said light.

8. An illumination system according to claim 7, wherein said drive circuit operable to apply a pulse width modulated voltage to said light source.

9. An illumination system according to claim 8, wherein said regulating means includes means for regulating the duty cycle of said pulse width modulated voltage in relationship to said scan rate.

10. An illumination system according to claim 6, wherein said drive circuit operable to supply a current to said light source in a controllable way.

11. An illumination system according to claim 10, wherein said regulating means include means for controlling the amount of said current supplied to said light source in relationship to said scan rate.

12. An illumination system according to claim 11, wherein said light source includes at least one light emitting diode for producing said light.

13. A method of operating a page illumination system for a page scanner capable of scanning said page by using said illumination system to project a scanning light onto said page and to move said scanning light relative to said page at a scan rate while exposing an image sensor to light reflected from said page, said method comprising:
   providing a light source operable to produce said light in response to receiving power;
   applying power to said light source; and
   regulating said power as a function of said scan rate while said page is being scanned.

14. A method according to claim 13, wherein said light source includes at least one light emitting diode (LED) for producing said light.

15. A method according to claim 14, wherein said applying step includes the sub step of applying a pulse width modulated voltage to said at least one LED.

16. A method according to claim 15, wherein said regulating step includes the sub step of regulating the duty cycle of said pulse width modulated voltage in relationship to said scan rate.

17. A method according to claim 14, wherein said applying step includes the sub step of supplying a current to said at least one LED and said regulating step includes the sub step of controlling the amount of said current received by said at least one LED in relationship to said scan rate.

18. A method according to claim 14, wherein said applying step includes the sub step of applying a pulse width modulated voltage to said light source.

19. A method according to claim 18, wherein said regulating step includes the sub step of regulating the duty cycle of said pulse width modulated voltage in relationship to said scan rate.

20. A method according to claim 13, wherein said applying step includes the sub step of supplying a current to said light source and said regulating step includes the sub step of controlling the amount of said current received by said light source in relationship to said scan rate.

* * * * *

UNITED STATES PATENT AND TRADEMARK OFFICE
CERTIFICATE OF CORRECTION

PATENT NO. : 7,064,872 B1  Page 1 of 1
APPLICATION NO. : 09/414383
DATED : June 20, 2006
INVENTOR(S) : Paul L Jeran

It is certified that error appears in the above-identified patent and that said Letters Patent is hereby corrected as shown below:

In column 8, line 58, in Claim 15, delete "LED." and
insert -- LED for producing said light. --, therefor.

In column 8, lines 65-66, in Claim 17, after "includes" delete "the sub step of".

Signed and Sealed this

Eighteenth Day of August, 2009

David J. Kappos
*Director of the United States Patent and Trademark Office*